Sept. 13, 1960  W. F. WELCH  2,952,200
CAMERA HOLDING MEANS
Filed Nov. 4, 1958
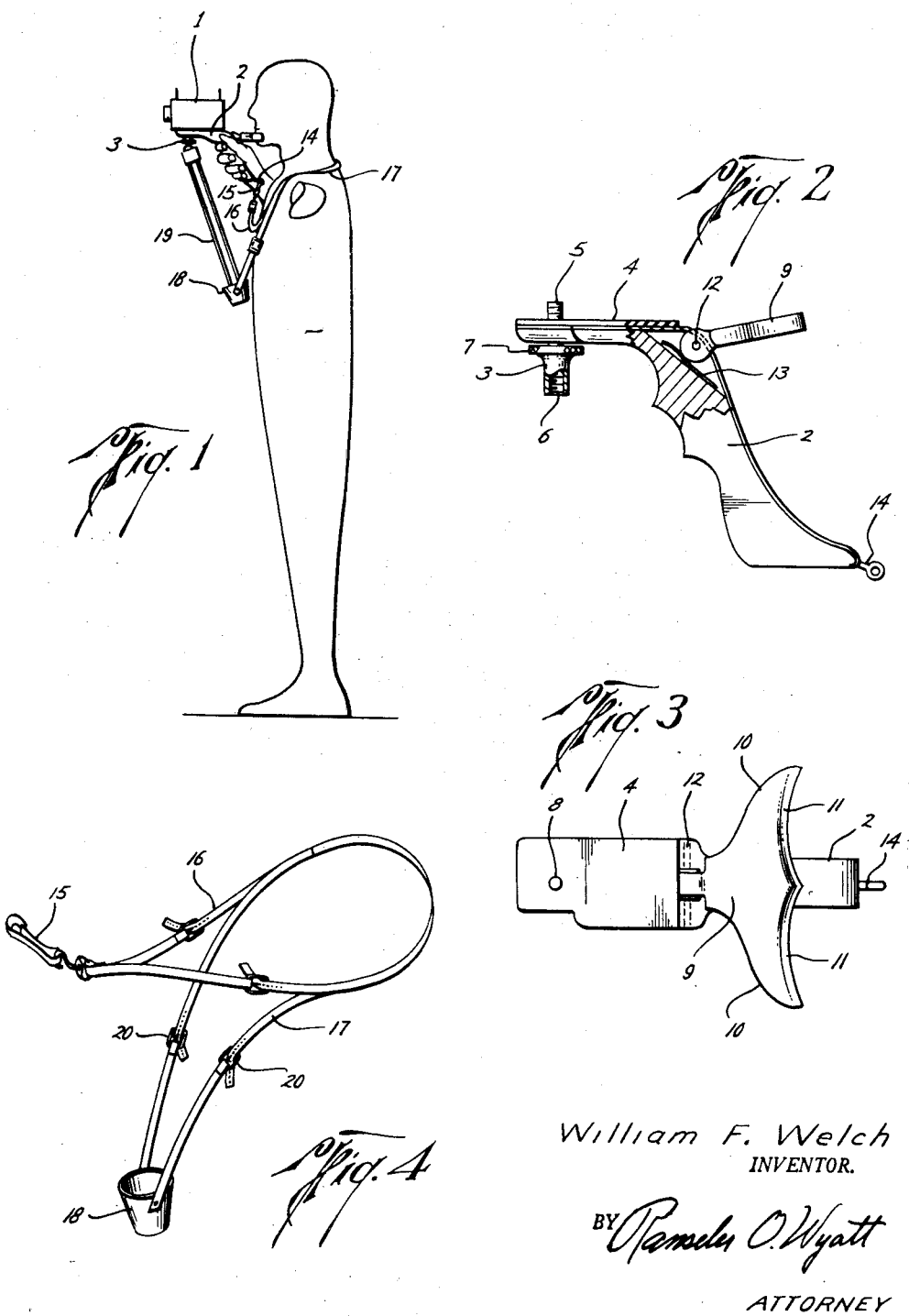
William F. Welch
INVENTOR.
BY *Pansley O. Wyatt*
ATTORNEY United States Patent Office 2,952,200
Patented Sept. 13, 1960

2,952,200

CAMERA HOLDING MEANS

William F. Welch, 501 Genoa-Red Bluff Road,
Genoa, Tex.

Filed Nov. 4, 1958, Ser. No. 771,904

2 Claims. (Cl. 95—86)

This invention relates to new and useful improvements in a camera holding means.

It is an object of this invention to provide a means for holding a camera while taking pictures that will provide a steady anchor for ease in aiming while taking stills and panoramic pictures.

It is another object of the invention to provide a camera accessory useful in steadying the camera and utilizing a tripod to relieve the user's arm from bearing the full weight of the camera.

It is another object of this invention to provide a novel grip and chin rest for supporting the camera and for use of a tripod with the grip and chin rest.

In taking moving pictures or still pictures where the camera is equipped with telescopic lens, the telescopic lens are usually heavy and extend from the front of the camera, making it difficult to keep the camera on the subject for extended periods of time and often there is neither time for setting up a tripod, nor a convenient place for use. It is an object of this invention to provide a ready means attached to the camera for providing adequate tripod support for such use.

With the above and other objects in view, the invention is more specifically defined in the following specifications and illustrated in the accompanying drawings, wherein:

Figure 1 is a side elevational view of the invention with a camera attached thereto, shown as in use by a person.

Figure 2 is a side elevational view of the grip, partially in cross section, illustrating the chin rest and the tripod receiving connection.

Figure 3 is a top plan view of the view shown in Figure 2, and

Figure 4 is a plan view of the strap and tripod rest.

In the drawings, the numeral 1 designates a camera, such as a movie camera, which is mounted on the grip 2 by means of the tripod connection 3. A friction pad, such as the rubber strip 4, is mounted on the grip 2 and abuts the bottom of the camera 1. The tripod connection consists of the male-female unit having the external threaded stud 5 and internally threaded socket 6 with a knurled flange 7. A port 8 is formed in the grip 2 to receive the male stud 5 which extends well through the port 8 and is mounted in the usual tripod receiving socket (not shown) in the camera. The top face of the grip 2 is reduced as at 21 to provide access to the flange 7.

A chin rest 9 is provided having outwardly flared wings 10, 10 and the concave end faces 11, 11. The chin rest 9 is pivotally mounted in the grip 2, as by means of the pin 12, and is yieldably anchored in position by the spring 13.

An eye bolt 14 is mounted in the end of the grip 2 to which the snap buckle 15 of the lanyard 16 may be secured. The lanyard 16 may be formed of any suitable material, such as the leather straps shown, and is integral with the tripod supporting means 17, which terminates in a conical cup 18.

In use, the camera is mounted on the grip 2 by means of the tripod connection 3, the bottom of the camera bearing against the friction pad 4. The user adjusts the chin rest 9 to provide proper sighting alignment through the sighting means on the camera and employs the right or left concave face 11 depending upon whether he employs the right or left eye in aiming the camera. Any lanyard desired may be attached to the eye belt 14 and secured to the user's wrist or around his neck in the usual manner; however, if additional support is desired, as when taking panoramic moving pictures, the harness formed by the straps 16, 17 may be placed around the user's neck and the buckle 15 attached to the eye bolt 14 and the tripod 19 mounted on the tripod connection 3. Any suitable telescoping tripod may be employed, with the legs thereof in telescoped position, and the lower end of the tripod is seated in the cup 18. The strips 17 may be adjusted to maintain the front of the camera at the desired level by means of the buckles 20, 20 and the weight of the camera thus borne by the harness rather than by the operating arm of the user. While not actually taking pictures, the camera and tripod may be carried by the user by means of the harness suspended from around the user's neck.

While the foregoing is considered a preferred form of the invention, it is by way of illustration only, the broad principle of the inventio being defined by the appended claims.

What I claim is:

1. In a camera holder a grip having a downwardly extending handle and a flat upper surface, a friction pad on said upper surface, said upper surface having a tripod connector port, a tripod connector having an externally threaded stud extending through said port and having an internally threaded socket beneath said stud to receive one end of a tripod support, an eye-bolt in the lower end of said handle, adjustable supporting means releasably secured to said eye-bolt and having integral tripod supporting means suspended therefrom and a tripod cup mounted on the lower ends of said tripod supporting means in which the lower ends of the legs of a telescoped tripod may be received.

2. In a camera holder, a band grip having an eye-bolt at one end and an outwardly extending flat projection at the other end, a vertical port adjacent the extended end of said projection, a tripod connector having one end externally threaded forming a camera holding stud and the other end forming an internally threaded socket, a chin rest pivotally mounted on said grip and yieldably anchored in position, said chin rest having left and right concave surfaces in the extended end thereof, an adjustable harness secured at one end to said eye-bolt and having a cup at the other end, said cup being adapted to receive the ends of the legs of a telescoped tripod when said tripod is mounted at the other end in said internally threaded socket.

References Cited in the file of this patent

UNITED STATES PATENTS

| | | |
|---|---|---|
| 1,018,711 | Neuberger | Feb. 27, 1912 |
| 1,993,485 | Paul | Mar. 5, 1935 |
| 2,357,377 | Bausch | Sept. 5, 1944 |
| 2,795,173 | Bates | June 17, 1957 |

FOREIGN PATENTS

| | | |
|---|---|---|
| 618,296 | Great Britain | Feb. 18, 1949 |